(12) United States Patent
Muraoka et al.

(10) Patent No.: US 7,384,157 B2
(45) Date of Patent: Jun. 10, 2008

(54) PROJECTION TYPE VIDEO DISPLAY

(75) Inventors: Koji Muraoka, Nishinomiya (JP);
Naoki Kaise, Higashi-Osaka (JP);
Yoshichika Hirao, Neyagawa (JP);
Toru Kirimura, Tsushima (JP); Ryoji Nakanishi, Higashi-Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 238 days.

(21) Appl. No.: 11/034,754

(22) Filed: Jan. 14, 2005

(65) Prior Publication Data
US 2005/0157270 A1   Jul. 21, 2005

(30) Foreign Application Priority Data
Jan. 16, 2004   (JP) .............................. 2004-009831

(51) Int. Cl.
*G03B 21/14*   (2006.01)
(52) U.S. Cl. .......................................... 353/69; 353/101
(58) Field of Classification Search ................ 353/70, 353/69, 30, 31, 101, 122, 121
See application file for complete search history.

(56) References Cited

U.S. PATENT DOCUMENTS 6,422,704 B1 *   7/2002   Gyoten et al. .............. 353/122
6,530,666 B1 *   3/2003   Smith et al. ................. 353/121
6,814,448 B2 *   11/2004  Ioka ............................. 353/69
7,175,285 B2 *   2/2007   Li et al. ........................ 353/70
2007/0097326 A1 *   5/2007   Yang ........................... 353/69

FOREIGN PATENT DOCUMENTS

JP   2003-78842   9/2003
JP   2004-205684   7/2004

OTHER PUBLICATIONS

Japanese Office Action dated Jan. 30, 2007 (recieved Feb. 2, 2007), Application No. 2004-009831.

* cited by examiner

*Primary Examiner*—William C. Dowling
(74) *Attorney, Agent, or Firm*—Westerman, Hattori, Daniels & Adrian, LLP.

(57) ABSTRACT

A projection type video display has a sensor which includes an image pick up device to take a projected image and the projection type video display projects an adjustment image to automatically implement the focus adjustment and the keystone distortion correction on the basis of output of the sensor.

3 Claims, 5 Drawing Sheets

PROJECTION TYPE VIDEO DISPLAY

CROSS REFERENCE TO RELATED APPLICATIONS

This application is based upon and claims priority of Japanese Patent Application No. 2004-009831, the contents of which are incorporated herein by reference.

BACKGROUND OF THE INVENTION

1. Field of the Invention

The present invention relates to a projection type video display such as a liquid crystal projector.

2. Description of the Related Art

As an adjustment content of a projection type video display at the setting of projection, there are a focus adjustment, a keystone distortion correction, and so on (see JP2003-78842).

To implement the focus adjustment or the keystone distortion correction described above, it is thought as a way that the projection type video display projects a stripe image which has white lines and black lines displayed alternately as an adjustment image and that an image pickup device takes the stripe image and that an output signal of the image pickup device which corresponds to the position of white lines and black lines is obtained. In this case, to implement the focus adjustment and the keystone distortion correction precisely, it is necessary that the stripe image is properly focused on the image pickup device.

SUMMARY OF THE INVENTION

In view of the foregoing circumstances, in accordance with embodiments of the present invention, a projection type video display is provided which properly focuses an adjustment image on an image pickup device which is used for a focus adjustment and a keystone distortion correction.

In order to solve the problems described above, in a projection type video display that optically modulates light emitted from a light source by a light valve and widely projects a video image by projection lens, in accordance with embodiments of the present invention, a projection type video display is provided which includes a sensor having an image pickup device which takes a projected image; means for generating an adjustment image; means for projecting the adjustment image; means for implementing the focus adjustment and/or the keystone distortion correction based on an output of the sensor when the adjustment image is focused on the sensor; and means for adjusting a pattern of the adjustment image to have the pattern of the adjustment image focused on the sensor approximately constant regardless of a zoom condition.

In accordance with a preferred embodiment of the present invention, the adjustment image comprises a striped image having a contrastive first line and second line.

In these configurations, another preferred embodiment of the present invention provides the projection type video display further including means for memorizing a reference information relating to the pattern of the adjustment image focused on the sensor at a reference zoom condition; means for generating adjustment value information to adjust the pattern of the adjustment image by comparing the reference information and the information of the pattern of the adjustment image focused on the sensor at the beginning of projecting.

To implement the focus adjustment and the keystone distortion correction precisely, it is desirable that the pattern of the adjustment image is focused on the image pickup device while having the pattern of the adjustment image approximately constant regardless of a zoom condition. In the configuration described above, the adjustment image could be focused on the image pickup device while having the pattern of the adjustment image regardless of the zoom condition and it is possible to implement the focus adjustment and the keystone distortion correction precisely.

It is possible to generate the adjustment value information by adding another sensor to detect a zoom condition. However, by memorizing the pattern detected on the sensor at the reference zoom condition and recognizing a zoom value indirectly on the basis of comparing this pattern and the pattern at the beginning of projecting such as the configuration described above, another sensor is not needed. And it contributes to be low in cost.

As explained above, according to the preferred embodiment of the present invention, the adjustment image could be focused on the image pickup device with having the pattern of the adjustment image regardless of the zoom condition. As a result, it is possible to implement the focus adjustment and the keystone distortion correction precisely. Memorizing the pattern detected on the sensor at the reference zoom condition and recognizing a zoom value indirectly on the basis of comparing this pattern and the pattern at the beginning of projecting such as the configuration described above, the additional sensor is not needed and a lower cost is achieved.

BRIEF DESCRIPTION OF THE DRAWING

The above and other objects and advantages of the present invention will become apparent and more readily appreciated from the following description of the preferred embodiments taken in conjunction with the accompanying drawings, of which.

DETAILED DESCRIPTION OF THE PREFERRED EMBODIMENTS

Figure 1:
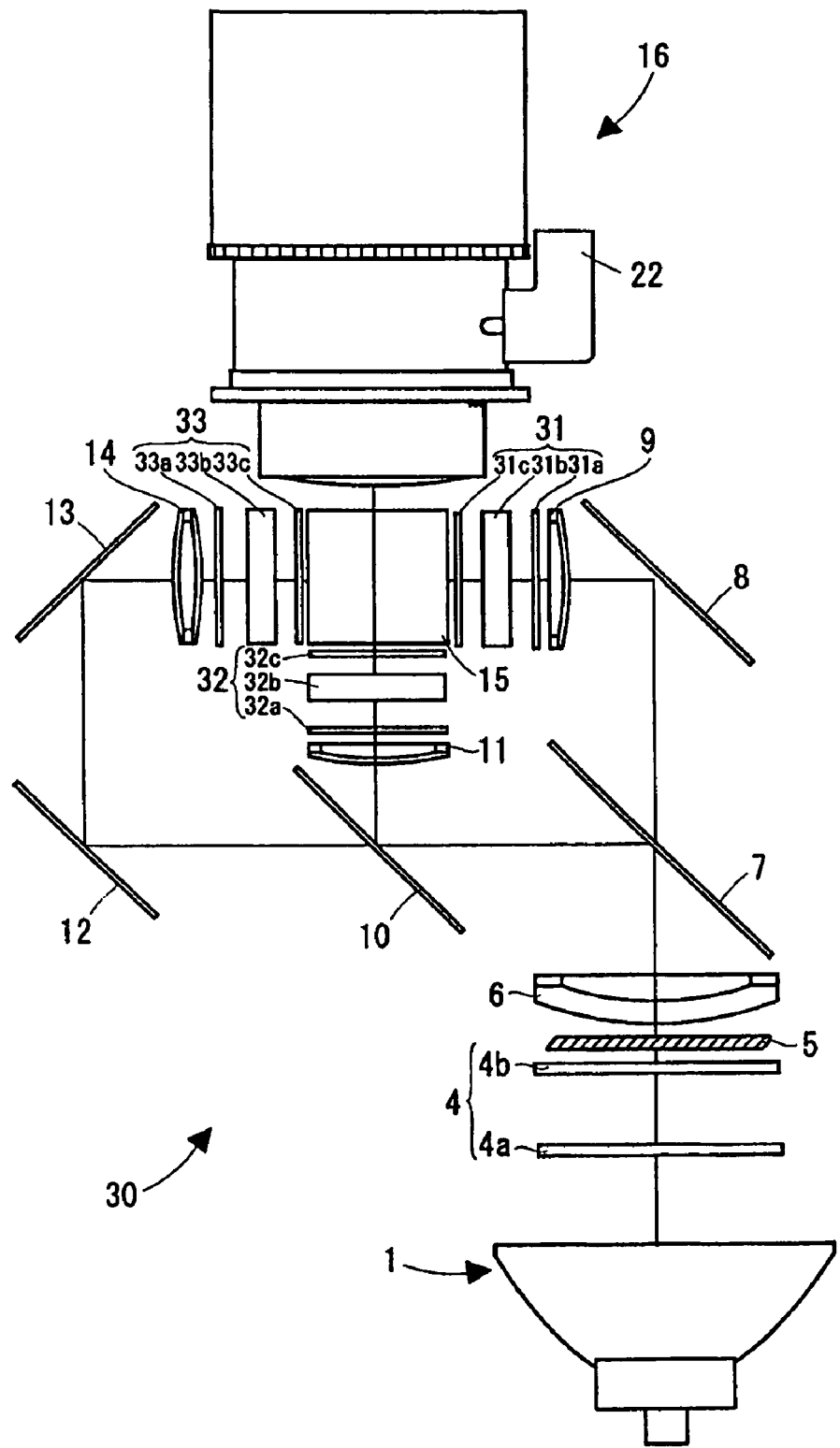
FIG. 1 illustrates an optical system which is preferably used in a liquid crystal projector in accordance with embodiments of the present invention.

Reference will now be made in detail to the preferred embodiments of the present invention, examples of which are illustrated in the accompanying drawing, wherein like reference numerals refer to like elements throughout.

Embodiments of the present invention will now be described below with reference to FIGS. 1 to 7.

FIG. 1 illustrates a triple-plate liquid crystal projector 30 of this embodiment of the present invention. An emission element of light source 1 may be any type of a variety of types of lamps, such as an ultra high-pressure mercury lamp, a metal halide lamp, a xenon lamp or other equivalent lamp. An emission light from the emission element becomes a parallel light by a parabolic reflector and it is conducted to an integrator lens 4.

The integrator lens 4 is made up of a pair of lens group 4a, 4b (fly eye lens). Each lens group 4a, 4b has plurality of lens portions respectively. And each lens portion conducts the emission light from the light source 1 to a whole area of a liquid crystal light valve described below, and it averages partial unevenness of brightness which is in the light source 1 and decreases a difference of light intensity between the center of image and the periphery of image. The light through the integrator lens 4 transmits through a polarized light converter 5 and a condenser lens 6, and it reaches a first dichroic mirror 7.

The polarized light converter 5 is made up with polarizing beam splitter array (hereinafter called 'PBS array'). PBS array includes a polarized light separation membrane and a retardation plate (½ λ plate). For example, each polarizing separation membrane of PBS array transmits P polarizing light and modifies S polarizing light at 90 degree. The modified S polarizing light is reflected at the adjacent polarizing separation membrane and is outputted. On the other hand, the P polarizing light transmitted is converted to the S polarizing light by the retardation plate which is set up in front of the polarizing separation membrane (light output side). In this case, almost all of the light is converted to the S polarizing light.

The first dichroic mirror 7 transmits the light of red wavelengths range and reflects the light of cyan (green and blue) wavelengths range. The light of red wavelengths range, which is transmitted through the first dichroic mirror 7, is reflected at the reflecting mirror 8 and is modified its optical path. The red light, which is reflected at the reflecting mirror 8, is transmitted through a lens 9 and is modulated by transmitting the liquid crystal light valve 31 of transmitting type for red light. On the other hand, the light of cyan wavelengths range, which is reflected at the first dichroic mirror 7, is led to a second dichroic mirror 10.

The second dichroic mirror 10 transmits the light of blue wavelengths range and reflects the light of green wavelengths range. The light of green wavelengths range, which is reflected at the second dichroic mirror 10, is transmitted through a lens 11. The green light is led to a liquid crystal light valve 32 of transmitting type for green light, and it is modulated by transmitting through the light valve 32. The blue light, which is transmitted through the second dichroic mirror 10, is reflected by an all reflecting mirror 12, and an all reflecting mirror 13, transmitted through lens 14 and is led to the liquid crystal light valve 33 of transmitting type for blue light, and it is modulated by transmitting this light valve 33.

Each liquid crystal light valve 31, 32, 33 respectively includes incident side polarizing plate 31a, 32a, 33a, panel member 31b, 32b, 33b, which are formed by encapsulating the liquid crystal between a pair of glass base plates (the pixel electrode and the orientation membrane are formed) and radiation side polarizing plate 31c, 32c, 33c.

The modulated light, which is modulated by transmitting through the liquid crystal light valve 31, 32, 33, are synthesized by cross dichroic prism 15 and become color image light. This color image light is expanded and projected by the projection lens 16 and is displayed on a screen 40 (shown in FIG. 4).

The projection lens 16 includes a driving motor 22 for focus adjustment and zoom adjustment. When a driving signal is given the motor 22 from microcomputer 25 (described below) the lens is moved.

Figure 2:
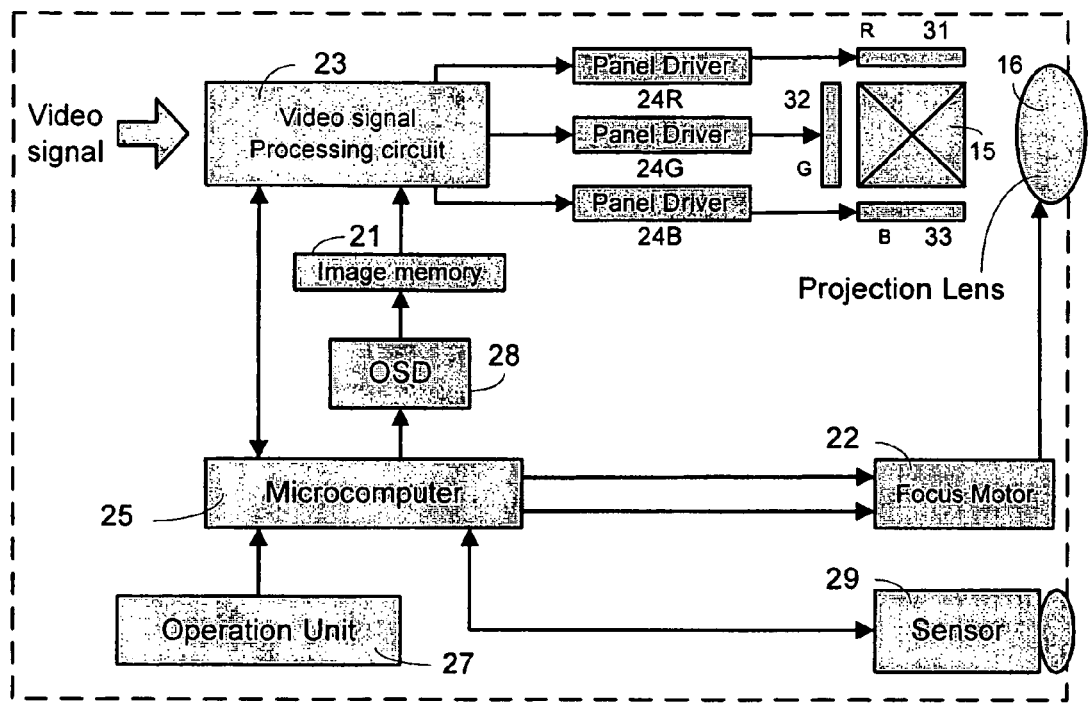
FIG. 2 is a block diagram of a signal processing system for a liquid crystal projector.

FIG. 2 illustrates the block diagram of a signal processing system of liquid crystal projector 30. A video image signal processing circuit 23 performs image processing and so on, such as the keystone distortion correction on the basis of a command from a microcomputer 25. Each panel driver 24R, 24G, 24B gives (drives) video image information (video image data) to liquid crystal light valves 31, 32 and 33 respectively.

An operation unit (or remote control transmitter) 27 includes a lot of keys for various operations. In this preferred embodiment, adjustment indication keys that command the focus adjustment and the keystone distortion correction are set up as the keys.

OSD (On Screen Display) circuit 28 generates the video image data in accordance with the characteristic or graphical information from the microcomputer 25, and writes the video image data in the image memory 21. By this OSD circuit 28, the video image which was produced in the product side other than input video image is projected.

Figure 3:
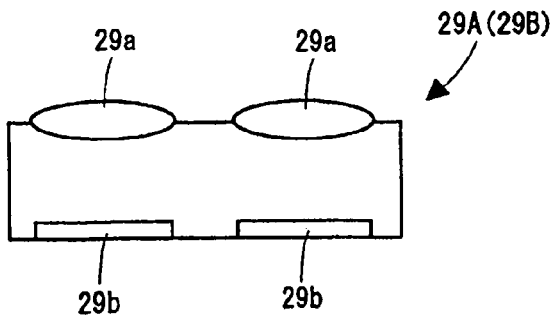
FIG. 3 is a schematic diagram showing the configuration of a sensor.
Figure 4A:
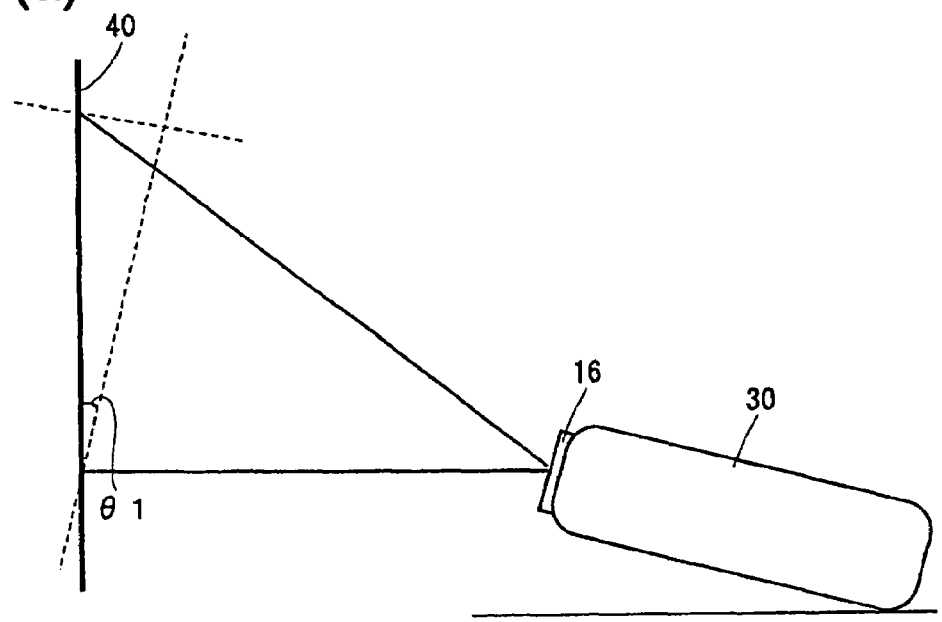
FIG. 4(a) is an explanatory drawing showing how vertical keystone distortion occurs.
Figure 4B:
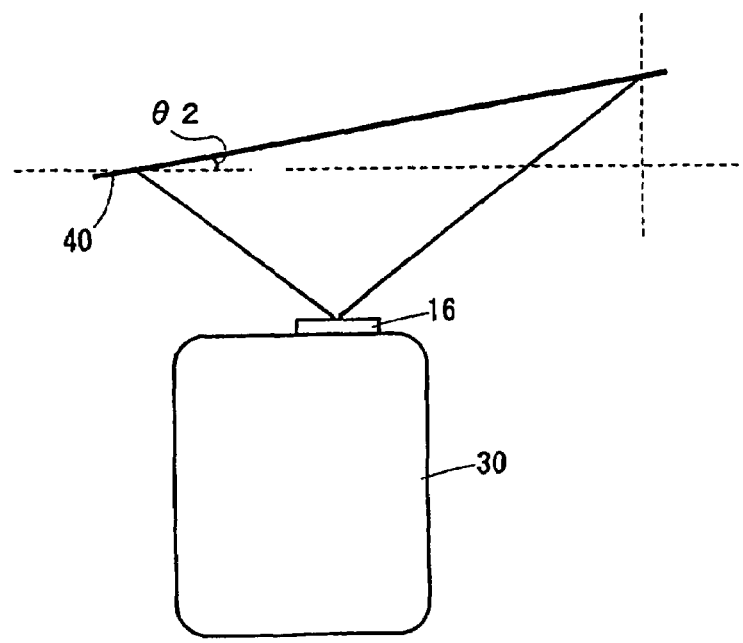
FIG. 4(b) is an explanatory drawing showing how horizontal keystone distortion occurs.

A sensor 29 consists of first sensor member 29A and second sensor member 29B (shown in FIG. 3). Each sensor member 29A, 29B, as shown in FIG. 3, includes two lens members 29a and CCD line sensors 29b which corresponds to each lens member 29A. The CCD line sensors 29b are widely formed along the direction of lens member 29a alignment. As the sensor members 29A, 29B, it is possible to use the sensor which is disclosed in the patent publication JP2002-213946 or JP2003-57531.

The first sensor member 29A is arranged as two lens members 29a, 29a are aligned for vertical direction sensing, and the second sensor member 29b is arranged as the lens members 29a, 29a are aligned for horizontal direction sensing.

The microcomputer 25 generates an image data by sampling the image signal of the sensor 29 and calculates a contrast data or an angle data. The contrast data indicates an extent of high-frequency component in the image signal that the CCD line sensor 29b outputs. The greater the extent of high-frequency component, the better it is in focusing. The angle data includes the first angle data θ1 which indicates an extent of lengthwise direction of the keystone distortion which is obtained by the first sensor member 29A (see FIG. 4a), and the second angle data θ2 which indicates an extent of crosswise direction of the keystone distortion which is obtained by the second sensor member 29B (see FIG. 4b).

The angle data can be obtained by arithmetic processing on the basis of the result of distance measurement from the sensor 29 to a projection video adjustment image (a screen 40). The distance measurement is performed using generally known triangular surveying, and it can be calculated by a focal length of the lens, a distance between the lens and the relative deviance (phase difference) of the pickup video image in the each CCD line sensor 29b of the sensor members 29A, 29B. The distance measurement can be performed in each multiple area of taking image area of the projection video adjustment image. In other words, dividing the area of field angle of CCD line sensor 29b into the multiple areas, the result of distance measurement can be calculated in each area of distance measurement. For example, the distance measurement is respectively calculated in the top area and the bottom area (or the leftmost area and the rightmost area). The difference of distance measurement value between the top area and the bottom area (or the leftmost area and the rightmost area) tend to be a large value corresponding to the extent of off vertical about the light axis and the screen. The angle data ($\theta 1$, $\theta 2$) can be calculated by calculating arctangent on the basis of the difference between the distance from the top area to the bottom area (or from the leftmost area to the rightmost area) and the distance measurement value.

The microcomputer 25 performs full control of the liquid crystal projector 30, and it especially performs the adjustment control relating to this invention at the initial projection setting described below.

Figure 5A:
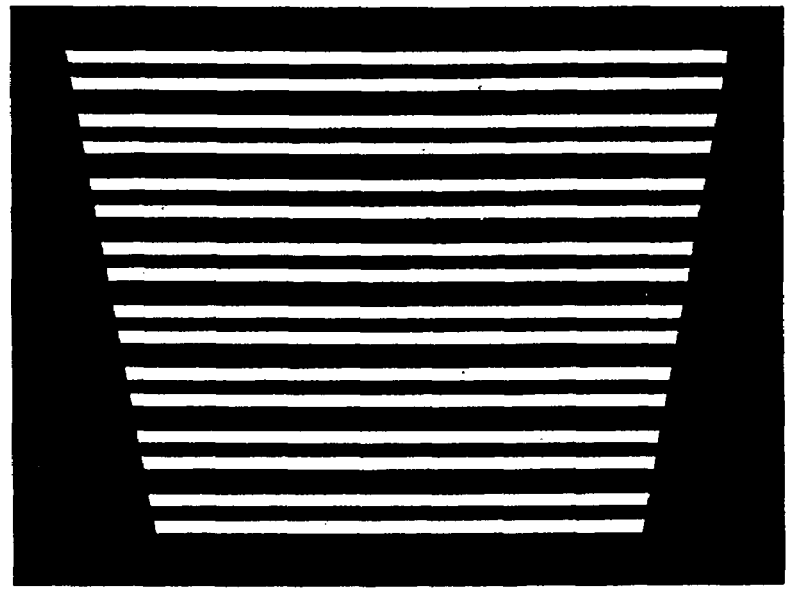
FIG. 5(a) is a schematic diagram showing the vertical keystone distortion in the first projection adjustment image projected on the screen.

A user, after the power source turning on, pushes down an adjustment indication key after waiting for the state that the light source becomes emitting enough. The microcomputer 25 commands drawing process of the first projection adjustment image (writing the image data in the image memory 21) to the OSD circuit 28 when it detects the adjustment indication key being pushed down. The first projection adjustment image is, as shown in FIG. 5(a), a stripe image that consists of the area of white horizontal lines and the area of black horizontal lines alternately.

The microcomputer 25 gives a supply direction drive signal to a motor (for focusing) 22 and generates the contrast data by sampling the image pickup signal. To begin the sampling, the microcomputer 25 starts a timer and generates the contrast data in a given period of time and stores the contrast data in the memory. The microcomputer 25 determines the most favorable contrast data and receives time information (information that lens focuses the focal point) when the most favorable contrast data is obtained. The microcomputer 25 gives a retraction direction signal to the motor 22 according to the time that is calculated by reducing the time information from the full time that the microcomputer 25 gives the supply direction drive signal. Herewith, a focus adjustment is achieved.

The microcomputer 25 performs keystone distortion correction on the basis of the image pickup data of sensor 29. There is the vertical keystone distortion and the horizontal keystone distortion in the keystone distortion. At first a gain process of the angle data $\theta 1$ for the vertical keystone distortion correction is performed by using the first projection adjustment image as shown in FIG. 5(a). That is, the microcomputer 25 takes on an output of the first sensor 29A and performs the distance measurement about the top area and the bottom area of the projection adjustment image, respectively, and calculates the angle data $\theta 1$ on the basis of the difference between the distance from the top area to the bottom area and the distance measurement value.

Figure 5B:
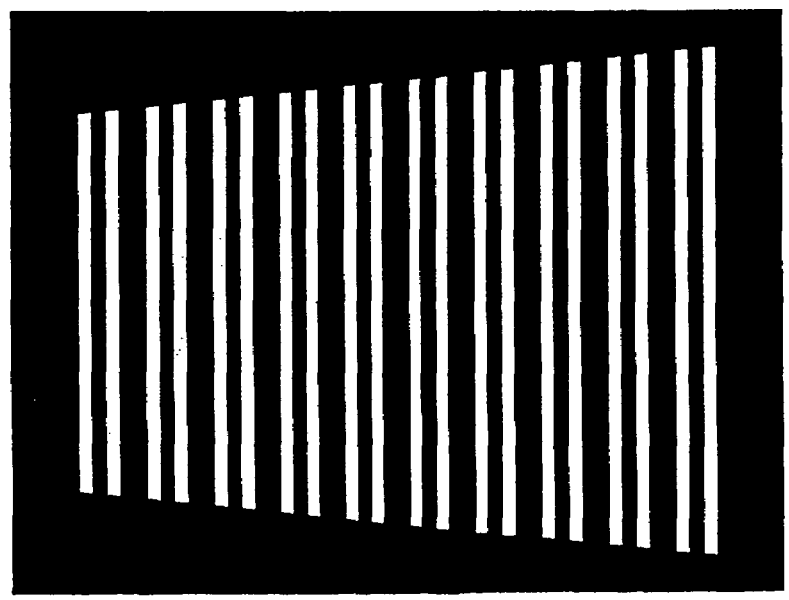
FIG. 5(b) is a schematic diagram showing the horizontal keystone distortion in the second projection adjustment image projected on the screen.

Then the microcomputer 25 performs the process of displaying the second projection adjustment image by the OSD circuit 28. The second projection adjustment image is, as shown in FIG. 5(b), a stripe image that consists of the area of white vertical lines and the area of black vertical lines alternately.

The microcomputer 25 takes on an output of the second sensor 29B and performs the distance measurement about the leftmost area and the rightmost area of the projection adjustment image, respectively, and calculates the angle data $\theta 2$ on the basis of the difference between the distance from the leftmost area to the rightmost area and the distance measurement value.

The microcomputer 25 performs the keystone distortion correction on the basis of the first angle data $\theta 1$ and the second angle data $\theta 2$. Since these angles and the keystone distortion are in proportional relationship, the amount of adjustment of image can be determined as long as it calculates the angles. For example, the video image signal processing circuit 23 receives the angle data from microcomputer 25 and performs pixel interpolation or pixel skipping process of the input signal. Then, the video image signal processing circuit 23 generates the input signal having inverted keystone distortion opposite from keystone distortion that is envisioned by projection on the basis of the angle.

Figure 6:
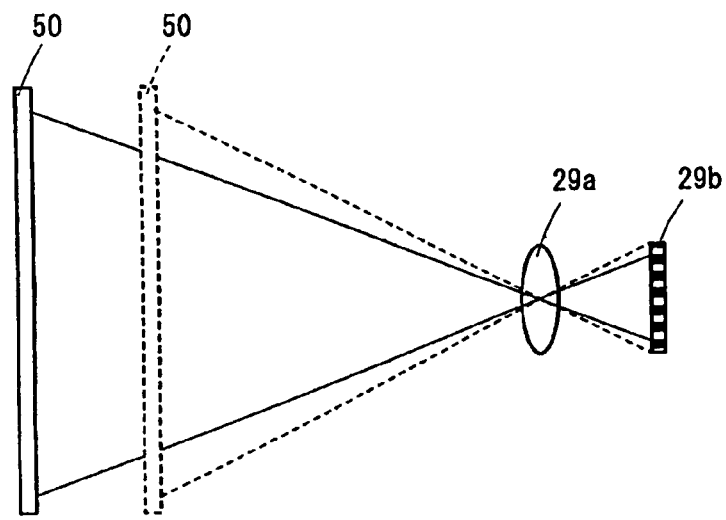
FIG. 6 is a schematic diagram showing how to direct the adjustment image to an image pick up element in different zoom conditions.

In case that the zoom function is given in projection lens 16, as shown in FIG. 6, the stripe image for adjustment is different in its interval (pitch) between white and black images when the stripe image for adjustment is projected in the zoom-in condition compared to the interval (pitch) between white and black images when the stripe image for adjustment is projected in the zoom-out condition. On the other hand, to implement the focus adjustment and the keystone distortion correction precisely, it is necessary that the stripe image is properly focused on the image pickup device. For this, it is desirable that the interval between white and black images focused on the CCD line sensor 29b is approximately constant.

Figure 7A:
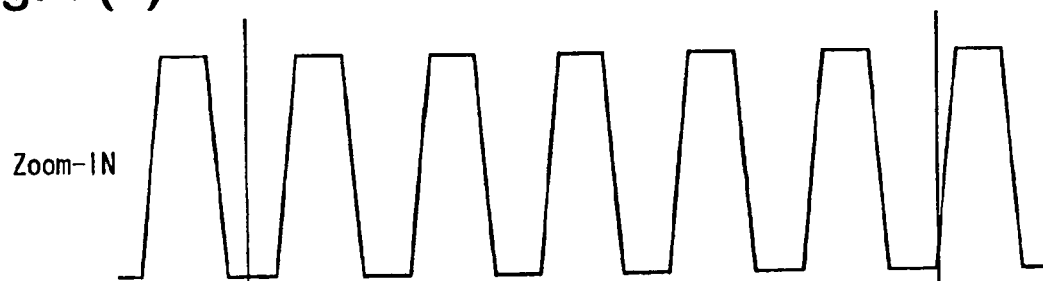
FIGS. 7(a) and 7(b) is a schematic diagrams showing an output of the image pick up element in different zoom conditions.

Then, for example, at the calibration it detects the number of white images on the CCD line sensor 29b and stores the image detected in a nonvolatile memory (not shown) as the interval between white and black images when the stripe image for adjustment is projected in the zoom-in (the edge of wide operation). Though the actual line number is about forty in this preferred embodiment, the appropriate line number of white images would be five for simplification, as shown in FIG. 7(a). The five white images is a desirable number in the CCD line sensor 29b to implement the focus adjustment and the keystone distortion correction precisely.

Figure 7B:
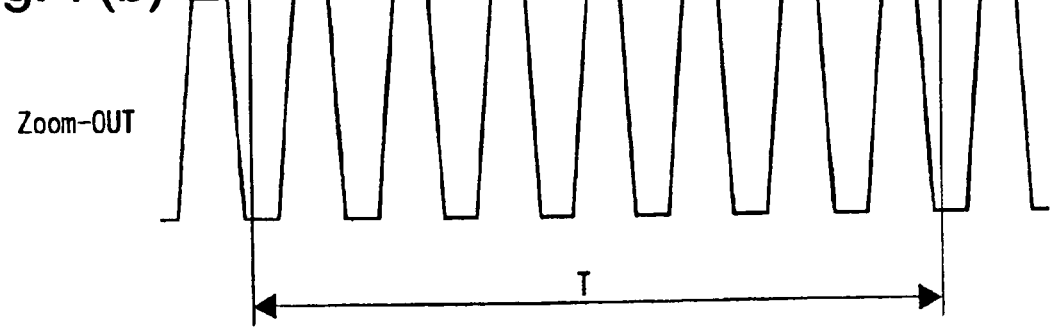

A real ratio of zooming is unknown when the projection type video display is actually used. The number of white images focused on the CCD line sensor 29b can be detected by projecting the video adjustment image at the beginning of projection. In case that the number of white images is seven, as shown in FIG. 7(b), the five white images are focused on the CCD line sensor 29b by displaying the adjustment image after multiplying the interval (pitch) between white and black images of the adjustment image by seven fifths. That is, the interval (pitch) between white and black images focused on the CCD line sensor 29b become desirable to implement the focus adjustment and the keystone distortion correction precisely.

The present invention does not exclude that a position sensor (rotating sensor) is set up to detect a position of the zoom lens of the projection lens 16 and that a stepping motor is set up to drive the zoom lens as a detecting method of zooming ratio. Detecting the zoom ratio itself by these methods is possible to implement the focus adjustment and the keystone distortion correction precisely. However, by memorizing the pattern detected on the sensor 29 at the reference zoom condition in the calibration and recognizing the zoom value indirectly on the basis of comparing this pattern and the pattern at the beginning of projecting through the configuration described above, another sensor or the stepping motor is not required, and the cost is reduced.

The calibration is executed at the shipping of the liquid crystal projector 30. For example, it sets such environment as the liquid crystal projector 30 is disposed on the bench which is set horizontally and the screen is disposed in the vertical direction of the optical axis. The angle data $\theta 1$ which is obtained at projecting the first adjustment image is stored as a first offset value (±α1) and the angle data θ2 which is obtained at projecting the second adjustment image is stored as a second offset value (±α2). The microcomputer 25 calculates, for example, an adjustment angle data by subtracting the offset value from the angle data when the first offset value or the second offset value is stored in the memory.

The present invention is not limited to the focus adjustment described above and the keystone distortion correction described above. The present invention may use any method of the focus adjustment and the keystone distortion correction. The present invention may use reflective type liquid crystal projectors although the preferred embodiment shows a transmissive type liquid crystal projector as a projection type video display. And it is not limited to liquid crystal projectors, the present invention may use projection type video displays which modulates light by driving plenty of micro-mirrors.

In the preferred embodiment, the microcomputer 25 for full control of the liquid crystal projector 30 performs the adjustment control at the projection setting. However, the present invention may have the configuration that a specific microcomputer is set in the sensor 29 and that the specific microcomputer performs the focus adjustment and a process which calculates the angle data and that the microcomputer 25 allocates its ability to another process. The present invention is not limited to the CCD line sensor, it may use a plane shaped, namely, two-dimensional, CCD. The present invention is not limited to respectively project the first adjustment image and the second adjustment image. The present invention may use not only the stripe pattern in white and black color as the adjustment image but also the stripe pattern in green and black color as the adjustment image.

Although a few preferred embodiments of the present invention have been shown and described, it will be appreciated by those skilled in the art that changes may be made in these embodiments without departing from the principals and spirit of the invention, the scope of which is defined in the appended claims and their equivalents.

What is claimed is:

1. In a projection type video display that optically modulates light emitted from a light source by a light valve and widely projects a video image by a projection lens, the projection type video display comprising:

a sensor having an image pickup device which receives a projected image;

means for generating an adjustment image;

adjustment image projecting means for projecting the adjustment image;

means for memorizing previously a reference information relating to a pattern of the adjustment image focused on the sensor when a zoom condition is in a reference zoom condition;

means for causing the adjustment image projecting means to project the adjustment image at the time of focus adjustment and/or keystone distortion correction, comparing information obtained from a pattern of the adjustment image focused on the sensor with the reference information relating to the pattern of the adjustment image, and thereby generating adjustment value information to adjust the pattern of the adjustment image; and means for adjusting the adjustment image based on the adjustment value information, and implementing the focus adjustment and/or the keystone distortion correction based on an output of the sensor when the adjustment image adjusted is focused on the sensor.

2. The projection type video display according to claim 1, wherein the adjustment image comprises a striped image having alternating contrasting lines.

3. The projection type video display according to claim 2, wherein the reference information relating to the pattern of the adjustment image is a number of lines of a predetermined color in the striped image, the predetermined color being one of two different colors of the alternating contrasting lines.

\* \* \* \* \*